United States Patent
Hirata et al.

(10) Patent No.: US 10,183,332 B2
(45) Date of Patent: Jan. 22, 2019

(54) SINTERING AND SHAPING METHOD

(71) Applicant: SEIKO EPSON CORPORATION, Tokyo (JP)

(72) Inventors: Koki Hirata, Nagano (JP); Shinichi Kato, Nagano (JP); Hiroshi Fukumoto, Nagano (JP); Chigusa Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/108,388

(22) PCT Filed: Apr. 20, 2015

(86) PCT No.: PCT/JP2015/002153
§ 371 (c)(1),
(2) Date: Jun. 27, 2016

(87) PCT Pub. No.: WO2015/162905
PCT Pub. Date: Oct. 29, 2015

(65) Prior Publication Data
US 2016/0325356 A1    Nov. 10, 2016

(30) Foreign Application Priority Data
Apr. 23, 2014   (JP) .................. 2014-088895

(51) Int. Cl.
B22F 3/16    (2006.01)
B29C 67/00   (2017.01)
(Continued)

(52) U.S. Cl.
CPC .............. B22F 3/16 (2013.01); B22F 1/0059 (2013.01); B22F 3/008 (2013.01); B28B 1/001 (2013.01);
(Continued)

(58) Field of Classification Search
CPC ......... B22F 3/16; B28B 1/001; B29C 64/165; B29C 67/0081; B33Y 10/00; B33Y 70/00
(Continued)

(56) References Cited

U.S. PATENT DOCUMENTS 4,793,968 A * 12/1988 Mosser .................... B22F 7/02
                                                    106/14.12
5,204,055 A    4/1993 Sachs et al.
(Continued)

FOREIGN PATENT DOCUMENTS

CN    102307827 A    1/2012
EP    2394974 A1    12/2011
(Continued)

Primary Examiner — Leo B Tentoni (57) ABSTRACT

Provided is a three-dimensional shaped article with relatively high strength and relatively high accuracy.
A sintering and shaping method includes: a shaping layer forming process of forming a shaping layer (5) by using a sintering and shaping material in which inorganic particles (2a) are included; a process of applying a liquid binding agent (8), in which inorganic particles (8a) are included, to a desired region of the shaping layer (5); a process of curing the liquid binding agent (8), which is applied, to form a shaping cross-sectional layer (shaping portion (5a)); a process of removing a region (non-shaping portion (5b)) of the shaping layer (5) to which the liquid binding agent (8) is not applied; and a process of heating the shaping cross-sectional layer that is laminated for a sintering treatment.

7 Claims, 3 Drawing Sheets

(51) Int. Cl.
  *B33Y 70/00* (2015.01)
  *B33Y 30/00* (2015.01)
  *B28B 1/00* (2006.01)
  *B28B 7/46* (2006.01)
  *B33Y 10/00* (2015.01)
  *B29C 64/165* (2017.01)
  *B22F 1/00* (2006.01)
  *B22F 3/00* (2006.01)

(52) U.S. Cl.
  CPC ............ *B28B 7/465* (2013.01); *B29C 64/165* (2017.08); *B29C 67/00* (2013.01); *B33Y 10/00* (2014.12); *B33Y 30/00* (2014.12); *B33Y 70/00* (2014.12); *B22F 2998/10* (2013.01)

(58) Field of Classification Search
  USPC ............... 264/113, 317; 419/36, 37, 61, 65
  See application file for complete search history.

(56) References Cited

U.S. PATENT DOCUMENTS

| | | |
|---|---|---|
| 5,340,656 A | 8/1994 | Sachs et al. |
| 6,036,777 A | 3/2000 | Sachs |
| 6,989,115 B2 | 1/2006 | Russell et al. |
| 7,037,382 B2 | 5/2006 | Davidson et al. |
| 7,220,380 B2 | 5/2007 | Farr et al. |
| 7,435,368 B2 | 10/2008 | Davidson et al. |
| 2004/0009089 A1* | 1/2004 | Liu ................. B33Y 70/00 419/38 |

FOREIGN PATENT DOCUMENTS

| | | |
|---|---|---|
| JP | 06-218712 A | 8/1994 |
| JP | 2000-144205 A | 5/2000 |
| JP | 2004-538191 A | 12/2004 |
| JP | 2005-120475 A | 5/2005 |
| JP | 2005-144870 A | 6/2005 |
| WO | WO-2009017648 A1 * | 2/2009 ............ C09D 11/00 |

\* cited by examiner

SINTERING AND SHAPING METHOD

TECHNICAL FIELD

The present invention relates to a sintering and shaping method, a liquid binding agent that is used in sintering and shaping, and a sintered shaped article.

BACKGROUND ART

As a shaping method of forming a stereo model (shaped article) having a three-dimensional shape, a lamination shaping method is known. As the lamination shaping method, for example, an optical shaping method in which a photo-curable resin is laminated while being selectively cured with laser so as to form respective cross-sectional layers of a shaped article, a powder sintering method in which a powder material is laminated while being selectively fused with laser and solidified so as to form respective layers, a molten material depositing method in which a thermoplastic material is heated, is extruded from a nozzle, and is deposited to form respective layers, a sheet laminating method in which sheet materials such as paper are cut in a cross-sectional shape of a model, are laminated, and are bonded to each other so as to form the model, and the like has been suggested.

PTL 1 discloses the following three-dimensional printing technology (method of manufacturing a three-dimensional shaped article).

First, powder materials which include ceramic, a metal, and the like are deposited in a layer shape. Then, a binder material, which binds the powder materials to each other, is applied to a selected region of a powder material layer. The binder material, which penetrates into a void between the powder materials, bonds the powder materials to each other, and thus a shaped article corresponding to a two-dimensional cross-sectional layer of a three-dimensional shaped article is formed. When deposition of the powder materials and application of the binder material are alternately repeated, two-dimensional cross-sectional layers are laminated, and thus a shaped article having a three-dimensional structure is formed (shaped).

CITATION LIST

Patent Literature

[PTL 1] JP-A-6-218712

SUMMARY OF INVENTION

Technical Problem

However, in the method of manufacturing the three-dimensional shaped article which is disclosed in PTL 1, the powder materials are bonded to each other with the binder material that is applied to the powder materials (shaping materials). Accordingly, for example, the method is different from a method of selectively fusing and solidifying a metal material (shaping material) through irradiation of laser or the like in a method of solidifying a shaping material, that is, in a type of binding the shaping materials to each other. The strength of the three-dimensional shaped article that is obtained is greatly different in accordance with a binding type of the shaping material. In general, the strength in the shaping method of bonding the powder materials with the binder material as disclosed in PTL 1 is greatly inferior to the strength in the method of fusing and solidifying the metal material. Accordingly, it can be considered that ceramic or a metal material is used as the powder materials, and a sintering process is introduced to improve connection between the powder materials so as to increase the strength of the three-dimensional shaped article. However, according to this method, a material that bonds the powder materials to each other is removed (degreased) through thermal decomposition, and the powder materials are sintered, and thus dimensional shrinkage of the three-dimensional shaped article is apt to increase, and thus there is a problem in that a variation in shape tends to occur. That is, with regard to the three-dimensional shaped article shaped by the method of manufacturing a three-dimensional shaped article as disclosed in PTL 1, in a case of being sintered to increase the strength thereof, there is a problem in that it is difficult to maintain base dimensions, and it is difficult to stably form the three-dimensional shaped article with relatively high strength and high accuracy.

Solution to Problem

An object of the invention is to solve at least a part of the above-described problems, and the invention can be executed by the following application examples or aspects.

Application Example 1

According to this application example, there is provided a sintering and shaping method including a shaping layer forming process of forming a shaping layer by using a sintering and shaping material in which first inorganic particles are included, a process of applying a liquid binding agent, in which second inorganic particles are included, to a desired region of the shaping layer, a process of curing the liquid binding agent, which is applied, to form a shaping cross-sectional layer; a process of removing a region of the shaping layer to which the liquid binding agent is not applied, and a process of heating the shaping cross-sectional layer for a sintering treatment.

The sintering and shaping method of this application example includes a shaping layer forming process of forming a shaping layer by using a sintering and shaping material in which first inorganic particles are included, a process of applying a liquid binding agent, in which second inorganic particles are included, to a desired region of the shaping layer, and a process of curing the liquid binding agent, which is applied, to form a shaping cross-sectional layer. Since these processes are included, it is possible to allow the second inorganic particles to be included in the shaping cross-sectional layer in addition to the first inorganic particles. In addition, the method includes a process of removing a region of the shaping layer to which the liquid binding agent is not applied, and a process of heating the shaping cross-sectional layer, which is laminated, for a sintering treatment. Since these processes are included, a three-dimensional shaped article is shaped by the shaping cross-sectional layer that is laminated. In addition, the sintering treatment is performed, and thus it is possible to increase the strength of the three-dimensional shaped article.

According to this application example, since the second inorganic particles are further included in the shaping cross-sectional layer in addition to the first inorganic particles, it is possible to obtain a three-dimensional shaped article in which a density (volume filling rate) of the inorganic particles (first and second inorganic particles) is relatively high. As a result, a dimensional variation (shrinkage) of the three-dimensional shaped article in the case of performing the sintering treatment is further suppressed, and thus it is possible to shape a three-dimensional shaped article with relatively high dimensional accuracy.

Application Example 2

In the sintering and shaping method according to the application example, the sintering treatment process may include a heating process of fusing the second inorganic particles to the first inorganic particles at a temperature that is lower than a sintering initiation temperature at which the first inorganic particles initiate sintering.

According to this application example, in the sintering treatment process, the second inorganic particles are fused to the first inorganic particles at a temperature that is lower than a sintering initiation temperature at which the first inorganic particles initiate sintering, and thus it is possible to allow the second inorganic particles to function as a binder that binds the first inorganic particles to each other. As a result, the dimensional variation (shrinkage) of the three-dimensional shaped article in the case of performing the sintering treatment is further suppressed, and thus it is possible to shape a three-dimensional shaped article with relatively high dimensional accuracy.

Application Example 3

In the sintering and shaping method according to the application example, the sintering and shaping material may include a thermoplastic binder that binds the first inorganic particles to each other, and the shaping layer forming process is performed by heating the sintering and shaping material to a temperature that is equal to or higher than a melting point of the thermoplastic binder.

According to this application example, the sintering and shaping material includes the thermoplastic binder that binds the first inorganic particles to each other. In addition, the shaping layer forming process is performed by heating the sintering and shaping material to a temperature that is equal to or higher than a melting point of the thermoplastic binder. Since the sintering and shaping material is heated to a temperature that is equal to or higher than the melting point of the thermoplastic binder, flowability of the sintering and shaping material increases. According to this, it is possible to spread the sintering and shaping material in a relatively easy manner, and thus it is possible to form a shaping layer with relatively high dimensional accuracy. In addition, in the heating process for the sintering treatment, the thermoplastic binder contributes to binding of the first inorganic particles until the thermoplastic binder is thermally decomposed (until degreasing is completed). According to this application example, it is possible to shape a three-dimensional shaped article with relatively high dimensional accuracy.

Application Example 4

In the sintering and shaping method according to the application example, a ratio between the weight of the first inorganic particles which are included in the shaping cross-sectional layer and the weight of the second inorganic particles which are included in the shaping cross-sectional layer may be in a range of 400:1 to 3:1.

According to this application example, since the ratio between the weight of the first inorganic particles which are included in the shaping cross-sectional layer and the weight of the second inorganic particles which are included in the shaping cross-sectional layer is in a range of 400:1 to 3:1, it is possible to perform shaping in a state in which the first inorganic particles are set as a main material. In addition, it is possible to obtain a three-dimensional shaped article in which a density of the inorganic particles is relatively high due to the second inorganic particles which are applied to the main material. As a result, the dimensional variation (shrinkage) of the three-dimensional shaped article in the case of performing the sintering treatment is further suppressed, and thus it is possible to shape a three-dimensional shaped article with relatively high dimensional accuracy.

Application Example 5

In the sintering and shaping method according to the application example, a ratio between an average particle size of the first inorganic particles and an average particle size of the second inorganic particles may be in a range of 50000:1 to 10:1.

According to this application example, since the ratio between the average particle size of the first inorganic particles and the average particle size of the second inorganic particles is in a range of 50000:1 to 10:1, it is possible to perform shaping in a state in which the first inorganic particles are set as a main material, and it is easy for the second inorganic particles, which are applied, to penetrate into a space between the main material (the first inorganic particles) in combination with the liquid binding agent. As a result, it is possible to form a shaping cross-sectional layer in which a density of the inorganic particles is increased with a relatively uniform manner, and thus it is possible to obtain a three-dimensional shaped article in which the density of the inorganic particles is increased with a relatively uniform manner. As a result, the dimensional variation (shrinkage) of the three-dimensional shaped article in the case of performing the sintering treatment is further suppressed, and thus it is possible to shape a three-dimensional shaped article with relatively high dimensional accuracy.

Application Example 6

In the sintering and shaping method according to the application example, the average particle size of the second inorganic particles may be 0.001 micrometers to 10 micrometers.

According to this application example, the average particle size of the second inorganic particles is 0.001 micrometers to 10 micrometers. That is, the second inorganic particles are inorganic particles having a size of a nano particle level (1 nm to 10000 nm). Accordingly, in a case of applying the liquid binding agent to a desired region of the sintering and shaping material in which the first inorganic particles are included, it is possible to allow the second inorganic particles to easily enter a void between the first inorganic particles. That is, it is possible to increase a density of the inorganic particles (first and second inorganic particles) in a relatively uniform manner, and thus it is possible to obtain a three-dimensional shaped article in which the density of the inorganic particles is increased in a relatively uniform manner. In addition, the second inorganic particles are inorganic particles having a size of a nano particle level, and thus when applying the second inorganic particles, it is possible to lower a sintering initiation temperature of the three-dimensional shaped article. That is, sintering of the second inorganic particles and the first inorganic particles is initiated at a relatively low temperature due to a size effect of the second inorganic particles.

Accordingly, for example, in a case of the first inorganic particles and the second inorganic particles are composed of the same metal, it is possible to initiate sintering at a temperature that is lower than a sintering initiation temperature in a case of the first inorganic particles alone. As a result, it is possible to suppress a dimensional variation (for example, a dimensional variation due to thermal decomposition (degreasing) of the binder material included in the sintering and shaping material) in the heating process for a sintering treatment from a relatively low temperature, and thus the dimensional variation (shrinkage) of the three-dimensional shaped article is further suppressed, and thus it is possible to shape a three-dimensional shaped article with relatively high dimensional accuracy.

Application Example 7

In the sintering and shaping method according to the application example, the first inorganic particles and the second inorganic particles may be ceramic particles or metal particles.

According to this application example, since the first inorganic particles and the second inorganic particles are ceramic particles or metal particles, it is possible to perform a sintering treatment with respect to a three-dimensional shaped article including these particles as a main material. As a result, it is possible to obtain a relatively strong three-dimensional shaped article.

Application Example 8

According to this application example, there is provided a liquid binding agent that is used in a method of manufacturing of a three-dimensional shaped article which includes a process of applying a liquid binding agent to a desired region of a sintering and shaping material in which first inorganic particles are included, and a process of curing the liquid binding agent that is applied. Second inorganic particles are included in the binding agent.

The liquid binding agent of this application example is a liquid binding agent that is used for manufacturing of a three-dimensional shaped article. The liquid binding gent is applied to a desired region of the sintering and shaping material in which the first inorganic particles are included, and the application region is cured to form a region that constitutes a three-dimensional shaped article. In addition, the second inorganic particles are included in the liquid binding agent. That is, according to the liquid binding agent of this application example, the second inorganic particles can be further included in the desired region for shaping of the three-dimensional shaped article in addition to the first inorganic particles. As a result, it is possible to obtain a three-dimensional shaped article in which the density of the inorganic particles is high.

Application Example 9

In the liquid binding agent according to this application example, an average particle size of the second inorganic particles may be 0.001 micrometers to 10 micrometers.

According to this application example, the average particle size of the second inorganic particles which are included in the liquid binding agent is 0.001 micrometers to 10 micrometers. That is, the second inorganic particles are inorganic particles having a size of a nano particle level. Accordingly, in a case of applying the liquid binding agent to a desired region of the sintering and shaping material in which the first inorganic particles are included, it is possible to allow the second inorganic particles to easily enter a void between the first inorganic particles. That is, it is possible to increase a density of the inorganic particles (first and second inorganic particles) in a relatively uniform manner, and thus it is possible to obtain a three-dimensional shaped article in which the density of the inorganic particles is increased in a relatively uniform manner.

Application Example 10

In the liquid binding agent according to the application example, the second inorganic particles may be ceramic particles or metal particles.

According to this application example, for example, in a case where the first inorganic particles are the same ceramic particles as the second inorganic particles, or in a case where the first inorganic particles are the same metal particles as the second inorganic particles, it is possible to perform a sintering treatment with respect to the three-dimensional shaped article in which these particles are set as a main material. As a result, it is possible to obtain a relatively strong three-dimensional shaped article.

Application Example 11

According to this application example, there is provided a sintered shaped article that is shaped by the sintering and shaping method according to any one of Application Example 1 to Application Example 7.

The sintered shaped article that is shaped by the sintering and shaping method according to the application example is provided as a three-dimensional shaped article in which the dimensional variation (shrinkage) of the three-dimensional shaped article in a case of performing the sintering treatment is further suppressed and dimensional accuracy is relatively high.

Application Example 12

According to this application example, there is provided a sintered shaped article that is shaped by using the liquid binding agent according to any one of Application Example 8 to Application Example 10.

The sintered shaped article that is shaped by using the liquid binding agent according to the application example is provided a three-dimensional shaped article having relatively high dimensional accuracy.

Application Example 13

According to this application example, there is provided a sintered shaped article including first inorganic particles which are included in advance in a sintering and shaping material to be laminated, and second inorganic particles which are included in a liquid binding agent that is applied to the sintering and shaping material that is laminated.

According to this application example, the sintered shaped article includes first inorganic particles which are included in advance in a sintering and shaping material to be laminated, and second inorganic particles which are included in a liquid binding agent that is applied to the sintering and shaping material that is laminated. That is, the sintered shaped article includes the second inorganic particles in addition to the first inorganic particles, and thus it is possible to obtain a sintered shaped article in which a filling rate of the inorganic particles is higher in comparison to a sintered shaped article that is constituted by the first inorganic particles alone.

DESCRIPTION OF EMBODIMENT

Hereinafter, description will be given to an embodiment that specifically illustrates the invention with reference to the accompanying drawings. The following description relates to an embodiment of the invention, and does not limit the invention. In addition, in the following respective drawings, description may be given with scales different from actual scales for easy understanding of description.

First Embodiment

As a first embodiment, description will be given to a sintering and shaping material in lamination shaping as one method of shaping a stereo model (sintered shaped article) having a three-dimensional shape, a sintering and shaping apparatus, a "sintering and shaping method", a "liquid binding agent" that is used in the sintering and shaping, and a "sintered shaped article" that is shaped by using these.

As a method of the lamination shaping, the following method is used. Specifically, a liquid binding agent is selectively applied to a thin layer formed from a sintering and shaping material by using an inkjet method, and sequential lamination is performed while curing a portion to which the liquid binding agent is applied so as to form a cross-sectional shape of a three-dimensional shaped article, thereby forming a three-dimensional shaped article.

Hereinafter, description will be made in detail.
(Sintering and Shaping Material)

Figure 1:
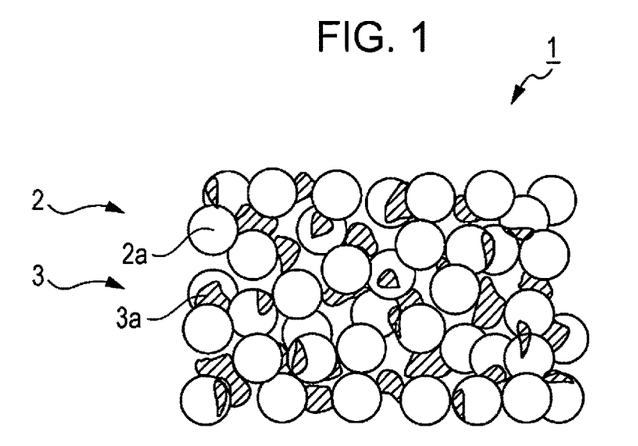
FIG. 1 is a conceptual diagram illustrating a state of a sintering and shaping material at ordinary temperature.

FIG. 1 is a conceptual diagram illustrating a state of a sintering and shaping material 1 at ordinary temperature (15 degrees of Celsius to 25 degrees of Celsius).

The sintering and shaping material 1 is a material (main material) that is used during shaping of a stereo model (sintered shaped article) having a three-dimensional shape by a lamination shaping method, and each layer that becomes the base of a sintered shaped article, that is, a layer (hereinafter, referred to as a "shaping layer") that forms a cross-sectional shape of a sintered shaped article is formed by using the sintering and shaping material 1.

The sintering and shaping material 1 includes a powder material 2 that is constituted by "first inorganic particles" of a powder, a binder material 3 as a "thermoplastic binder", and the like.

The powder material 2 is an important constituent material of a sintered shaped article that is formed by using the sintering and shaping material 1.

The powder material 2 is configured as an aggregate of inorganic particles 2a as the "first inorganic particles".

As the inorganic particles 2a, metal particles or ceramic particles may be used. The inorganic particles 2a have an approximately spherical shape in which an average particle size is 0.1 micrometers to 30 micrometers. It is more preferable that the average particle size is 1 micrometer to 15 micrometer. In addition, the closer to a perfectly spherical shape, the more preferable. According to this, controllability relating to a shape of the sintered shaped article, particularly, controllability of a shape in sides or corners, which define an external shape of the sintered shaped article, is improved.

In addition, it is preferable that the particle size of the inorganic particles 2a is equal to or less than an average thickness of a shaping layer that is formed by the sintering and shaping material 1, and more preferably equal to or less than the half of the average thickness of the shaping layer. According to this, a density (volume filling rate) of the inorganic particles 2a in the shaping layer is improved, and thus it is possible to improve the mechanical strength of the sintered shaped article.

In addition, it is preferable that the powder material 2 includes inorganic particles 2a having particles sizes which are in the above-described particle size range and are different from each other. In addition, a particle size distribution of the inorganic particles 2a may be a distribution that is close to Gauss distribution (normal distribution), or a distribution (deflected distribution) in which the maximum value of a particle size distribution is present on a maximum size side or on a minimum size side.

In a case where the particle size of the inorganic particles 2a is a single value, a volume filling rate by the inorganic particles 2a when forming a sintered shaped article does not exceed 69.8% that is a theoretical value during closest packing, and a filling rate of approximately 50% to 60% is actually obtained. In contrast, when inorganic particles 2a having particle sizes different from each other are included in the powder material 2 (when particle sizes are distributed in a range), for example, an inorganic particle 2a having a relatively small particle size is disposed in a void that is formed by inorganic particles 2a having a relatively large particle size, and thus the volume filling rate is improved. According to this, it is possible to improve the mechanical strength of a sintered shaped article. Specifically, it is preferable that the volume filling rate becomes approximately 70%.

As the powder material 2 (inorganic particles 2a), a stainless alloy powder is used as an appropriate example. In addition, the powder material 2 is not limited to the stainless alloy powder. Examples of the powder material 2 include powders of copper, bronze (Cu/Sn), brass (Cu/Zn), tin, lead, gold, silver, platinum, palladium, iridium, titanium, tantalum, iron, carbonyl iron, and the like, metal alloy powders of a titanium alloy, a cobalt alloy, an aluminum alloy, a magnesium alloy, an iron alloy, a nickel alloy, a chromium alloy, a silicon alloy, a zirconium alloy, a gold alloy, and the like, magnetic alloy powders including Fe/Ni, Fe/Si, Fe/Al, Fe/Si/Al, Fe/Co, Fe/Co/V, and the like, intermetallic compounds such as aluminum titanate, and the like. In addition, in a case of a ceramic powder, an alumina powder, a zirconia powder, and the like are possible.

The binder material 3 is a thermoplastic polymer compound. In the sintering and shaping material 1, when the powder material 2 and the binder material 3 are mixed, and the inorganic particles 2a are distributed in an approximately uniform manner, the binder material 3 has a function of binding the inorganic particles 2a to each other. As illustrated in FIG. 1, when the powder material 2 and the binder material 3 are mixed with each other with approximately uniform distribution, for example, the binder material 3 binds the inorganic particles 2a to each other as a binder flake 3a having a flake shape.

As the binder material 3, for example, polycaprolactone diol having the melting point of 55 degrees of Celsius to 58 degrees of Celsius and a thermal decomposition initiation temperature of approximately 200 degrees of Celsius is used as an appropriate example.

In addition, the binder material 3 is not limited to the polycaprolactone diol, and a binder material, which has solid thermoplasticity at ordinary temperature, and a thermal decomposition initiation temperature of 50 degrees of Celsius or higher which is lower than a sintering temperature of the inorganic particles 2a, is used. Examples of the binder material 3 may include an ethylene-vinyl acetate copolymer having a melting point of approximately 50 degrees of Celsius to 100 degrees of Celsius, and a thermal decomposition initiation temperature of approximately 250 degrees of Celsius, polyethylene having a melting point of approximately 120 degrees of Celsius and a thermal decomposition initiation temperature of approximately 400 degrees of Celsius, and the like.

The above-described binder materials are solids of a wax type, a Vaseline type, a flake type, and the like at ordinary temperature, and when exceeding a melting point, the binder materials are dissolved and become a liquid phase.

In the sintered shaped article, the higher a filling rate of the inorganic particles 2a which constitute the powder material 2 is, the higher the accuracy relating to the shape of the sintered shaped article is. Accordingly, so as to increase the accuracy relating to the shape of the sintered shaped article, it is preferable to set a mixing ratio in such a manner that a volume occupied by the binder material 3 becomes smaller than a void of the inorganic particles 2a which are closely filled in order for the inorganic particles 2a to be closely filled. Accordingly, as a volume ratio of the powder material 2 to the binder material 3, a range of 7:3 to 9:1 is preferable.

In addition, the sintering and shaping material 1 may include a solvent. As the solvent, an aqueous solvent including a non-organic solvent such as water and an aqueous solution of an inorganic salt is preferable. As the aqueous solvent, it is more preferable to use water. When the sintering and shaping material 1 includes the solvent, it is possible to easily obtain a paste-like sintering and shaping material in which the powder material 2 is uniformly distributed. In addition, it is easy to spread the paste-like sintering and shaping material due to the solvent, and thus it is possible to form the shaping layer in a relatively small thickness.

(Sintering and Shaping Apparatus)

Figure 2:
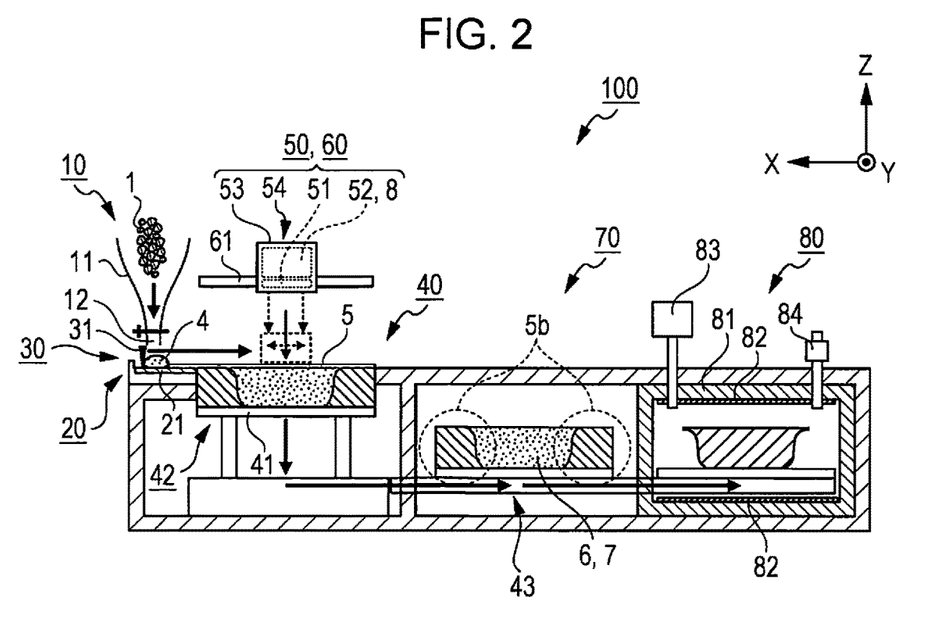
FIG. 2 is a schematic diagram illustrating a sintering and shaping apparatus.

FIG. 2 is a schematic diagram illustrating a sintering and shaping apparatus 100.

In FIG. 2, a Z-axis direction is an upper and lower direction, a −Z direction is a vertical direction, a Y-axis direction is a forward and backward direction, a +Y direction is a forward direction, an X-axis direction is a right and left direction, +X direction is a left direction, and an X-Y plane is set as a plane that is parallel with a plane on which the sintering and shaping apparatus 100 is provided.

The sintering and shaping apparatus 100 is an apparatus that shapes a stereo model (sintered shaped article) having a three-dimensional shape by a lamination shaping method by using the sintering and shaping material 1.

The sintering and shaping apparatus 100 includes a material supply section 10, a heating section 20, a spreading section 30, a shaping section 90, a drawing section 50, a curing section 60, an appearance section 70, a degreasing and sintering section 80, a control unit (not shown) that controls the respective sections, and the like.

The material supply section 10 is a section that supplies the sintering and shaping material 1 that is accommodated to the heating section 20, and is provided with, for example, a hopper 11 that is illustrated in FIG. 2. The hopper 11 supplies the sintering and shaping material 1, which is accommodated therein, from a material ejecting port 12 located on an upper side of the heating section 20 to the heating section 20.

In addition, the material supply section 10 is not limited to the configuration, and may have the following configuration (not illustrated), and the like. Specifically, the material supply section 10 may be provided with a loading section that loads and heats a cartridge in which the sintering and shaping material 1 is accommodated. The loading section may heat the loaded cartridge to a temperature equal to or higher than a melting point of the binder material 3 in order for the sintering and shaping material 1 to have flowability, and may supply the sintering and shaping material 1 to the heating section 20.

The heating section 20 is provided with a hot plate 21 that heats and maintains the sintering and shaping material 1 to a temperature equal to or higher than the melting point of the binder material 3. The binder material 3 in the sintering and shaping material 1, which is supplied from the material supply section 10, is melted on the hot plate 21, and thus the sintering and shaping material 1 becomes a flowable shaping material 4 having flowability.

The spreading section 30 is provided with a squeegee 31.

The squeegee 31 is an elongated plate-shaped body which is provided to be movable in the X-axis direction and extends in the Y-axis direction. On the X-Y plane, the squeegee 31 moves the flowable shaping material 4 in the −X direction in a scrubbing manner, and thus the squeegee 31 can spread the flowable shaping material 4 in a small thickness.

The spreading section 30 spreads the flowable shaping material 4 on a stage 41 provided to the shaping section 40, thereby forming the shaping layer 5.

In addition, a method of spreading the flowable shaping material 4 in a small thickness is not limited to the spreading method by using the squeegee 31. For example, a method in which the flowable shaping material 4 is pressed with air to spread the flowable shaping material 4, a method in which a stage provided with a heating section is rotated to spread the flowable shaping material 4 by using the centrifugal force, and the like are possible.

The shaping section 40 is provided with a stage 41, a stage elevating mechanism 42 that elevates the stage 41 in the Z-axis direction, and the like. The stage 41 constitutes the X-Y plane on which the flowable shaping material 4 is spread by the squeegee 31 at an initial position located in the same plane (at the same height) as the hot plate 21.

The stage 41 is maintained at ordinary temperature (for example, room temperature). The flowable shaping material 4 spread on the stage 41 loses flowability at a temperature lower than the melting point, and the shaping layer 5 is newly laminated on the shaping layer 5 that is previously laminated. The flowable shaping material 4 that is spread may be left as is up to a temperature lower than the melting point, or may be cooled down. Examples of a cooling method that can be used include a method of blowing wind, which is kept at ordinary temperature or cooled down, to the shaping layer 5 by using a fan and the like, a method of bringing a cooling plate into contact with the shaping layer 5, and the like.

The stage elevating mechanism 42 allows the stage 41 to descend in accordance with a layer thickness of the shaping layer 5 that is spread and formed on the stage 41. When the stage 41 descends, the surface of the shaping layer 5 is positioned in the same plane (at the same height) as the hot plate 21, and thus the X-Y plane, on which the flowable shaping material 4 is spread by the squeegee 31 and is laminated as the shaping layer 5, is constructed again.

The drawing section 50 is provided with an ejection head 51, a cartridge loading unit 52, a carriage 53, a carriage moving mechanism 54 (not illustrated), and the like.

The ejection head 51 is provided with a nozzle (not illustrated) that ejects a liquid binding agent 8 to the shaping layer 5 on the stage 41 by an ink jet method.

The cartridge loading unit 52 loads an ink cartridge in which the liquid binding agent 8 is accommodated, and supplies the liquid binding agent 8 to the ejection head 51.

The carriage 53 mounts the ejection head 51 and the cartridge loading unit 52 (that is, the ink cartridge) thereon, and moves on an upper surface of the stage 41 by the carriage moving mechanism 54.

The carriage moving mechanism 54 includes an X-Y axis linear-transporting mechanism, and moves (scans) the carriage 53 on the X-Y plane.

The drawing section 50 forms a desired image (an image that reflects a cross-sectional shape of a sintered shaped article) by the liquid binding agent 8 on the shaping layer 5 spread on the stage 41 under control by a control unit. Specifically, the control unit has input image information, which is input thereto in advance, of each cross-sectional layer that constitutes the sintered shaped article, and controls a position to which the ejection head 51 is moved, and a timing at which the liquid binding agent 8 is ejected in accordance with the image information, thereby applying the liquid binding agent 8 to each corresponding shaping layer 5.

The curing section 60 is provided with a liquid binding agent curing mechanism 61 which cures the liquid binding agent 8 that is applied to the shaping layer 5 to form the shaping cross-sectional layer 6. For example, in a case where a material including an ultraviolet curable resin is used as the liquid binding agent 8, the liquid binding agent curing mechanism 61 is constituted by an ultraviolet ray irradiation device. In addition, for example, in a case where a material including a thermosetting resin is used as the liquid binding agent 8, the liquid binding agent curing mechanism 61 is constituted by a heating device.

The appearance section 70 is a portion which removes a region (non-shaping portion 5*b*) of the shaping layer 5 to which the liquid binding agent 8 is not applied so as to allow a shaped article 7 to appear, and is disposed on a −X side of the shaping section 40. The appearance section 70 is provided with an unnecessary portion removing unit (not illustrated) such as a cutting knife and a rotary brush, and performs an appearance treatment with respect to a shaped article (laminated article of the shaping layer 5) that is transported from the shaping section 40 by the transporting mechanism 43.

In addition, in a case where the binder material 3 is an aqueous material, the appearance treatment is also a method of washing and removing the non-shaping portion 5*b* through water-washing and the like, and thus a configuration in which a water-washing bath and the like are provided as the unnecessary portion removing unit is also possible.

The degreasing and sintering section 80 is a portion which degreases the shaped article 7 (shaping cross-sectional layer 6 that is laminated) from which the non-shaping portion 5*b* is removed, and sinters the shaped article, and is disposed on a −X side of the appearance section 70. The degreasing and sintering section 80 is provided with a degreasing and sintering furnace 81, a heating heater 82, a degreasing gas supply facility 83, an exhaust facility 84, and the like, and performs a degreasing and sintering treatment with respect to the shaped article 7 that is transported from the appearance section 70 by the transporting mechanism 43.

In addition, description has been given to a configuration of the sintering and shaping apparatus 100 in which the appearance section 70 and the degreasing and sintering section 80 are provided continuously from the shaping section 40 as an example, but there is no limitation thereto. For example, the appearance section 70 and the degreasing and sintering section 80, or each of the appearance section 70 and the degreasing and sintering section 80 may be configured as an individual body.

(Liquid Binding Agent)

Figure 3:
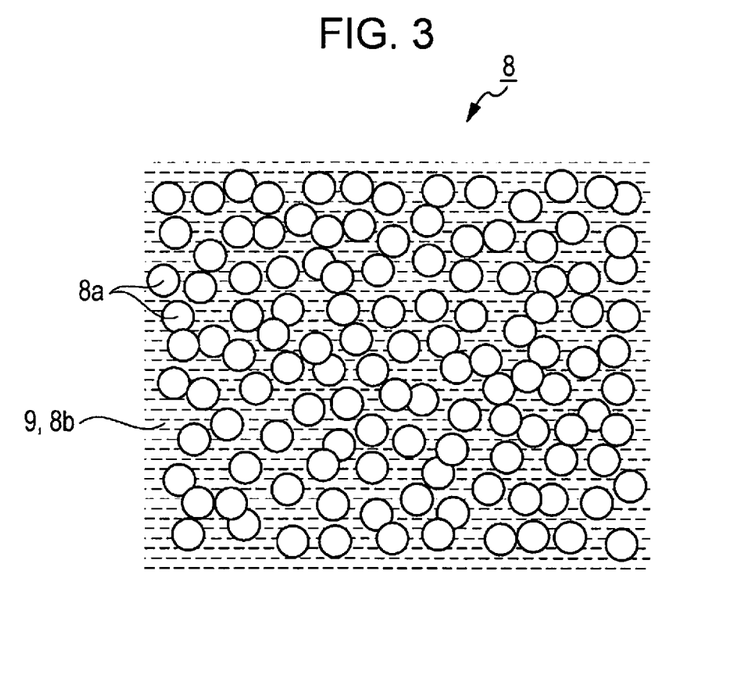
FIG. 3 is a conceptual diagram of a liquid binding agent according to a first embodiment.

FIG. 3 is a conceptual diagram of the liquid binding agent 8 as the "liquid binding agent" according to the first embodiment.

The liquid binding agent 8 includes inorganic particles 8*a* as "second inorganic particles" at a liquid portion 9 in a liquid phase. In addition, a curing agent 8*b* is included in the liquid portion 9.

As is the case with the inorganic particles 2*a*, metal particles or ceramic particles may be used as the inorganic particles 8*a*. As is the case with the inorganic particles 2*a*, stainless alloy powders are used as an appropriate example. In addition, the inorganic particles 8*a* are not limited to the stainless alloy. Examples of the inorganic particles 8*a* include copper, bronze (Cu/Sn), brass (Cu/Zn), tin, lead, gold, silver, platinum, palladium, iridium, titanium, tantalum, iron, carbonyl iron, and the like. In addition, examples of the inorganic particles 8*a* include metal alloy a titanium alloy, a cobalt alloy, an aluminum alloy, a magnesium alloy, an iron alloy, a nickel alloy, a chromium alloy, a silicon alloy, a zirconium alloy, a gold alloy, and the like. In addition, examples of the inorganic particles 8*a* include magnetic alloys including Fe/Ni, Fe/Si, Fe/Al, Fe/Si/Al, Fe/Co, Fe/Co/V, and the like, intermetallic compounds such as aluminum titanate, and the like. In addition, in a case of ceramic, alumina, zirconia, and the like are possible.

The inorganic particles 8*a* have an approximately spherical shape in which an average particle size is 0.001 micrometers to 10 micrometers. In addition, it is more preferable that the average particle size of the inorganic particles 8*a* is 0.001 micrometers to 5 micrometers. The closer to a perfectly spherical shape, the more preferable. In addition, a ratio between the average particle size of the inorganic particles 2*a* and the average particle size of the inorganic particles 8*a* is in a range of 50000:1 to 10:1. According to this, it is possible to allow the inorganic particles 8*a* to easily enter a void between the inorganic particles 2*a*. That is, it is possible to increase a density of the inorganic particles (the inorganic particles 2*a* and the inorganic particles 8*a*) in a more uniform manner, and thus it is possible to obtain a three-dimensional shaped article in which the density of the inorganic particles is increased in a more uniform manner.

As the curing agent 8*b*, an ultraviolet curable resin (ultraviolet polymerizable compound) is used as an appropriate example, but there is no limitation thereto. Examples of the curing agent 8*b* include a thermoplastic resin, a thermosetting resin, various photo-curable resins such as a visible light-curable resin (a photo-curable resin in a narrow sense) that cures with light in a visible light region, and an infrared curable resin, an X-ray curable resin, and the like. In addition, a configuration in which one or more kinds selected from these resins are combined is also possible.

In addition, for example, the liquid binding agent 8 (liquid portion 9) may include components such as a dispersant, a surfactant, a polymerization initiator, a polymerization promoter, a solvent, a penetration promoter, a wetting agent (moisturizing agent), a fixing agent, mildew proofing agent, a preservative, an antioxidant, an ultraviolet absorber, a chelating agent, a pH adjusting agent, a thickener, an aggregation preventing agent, and an antifoaming agent.

(Sintering and Shaping Method)

Next, description will be given to a "sintering and shaping method" of shaping a "sintered shaped article" by using the sintering and shaping material 1 and the liquid binding agent 8, and the sintering and shaping apparatus 100.

The sintering and shaping method according to this embodiment includes the following processes.

(1) A shaping layer forming process of forming the shaping layer 5 by using the sintering and shaping material 1 in which the inorganic particles 2a are included.

(2) A process of applying the liquid binding agent 8, in which inorganic particles 8a are included, to a desired region of the shaping layer 5.

(3) A process of curing the liquid binding agent 8, which is applied, to form the shaping cross-sectional layer 6.

(4) A process of removing a region of the shaping layer 5 to which the liquid binding agent 8 is not applied.

(5) A process of heating the shaping cross-sectional layer 6 that is laminated for a sintering treatment.

Hereinafter, description will be made sequentially with reference to FIG. 2.

In addition, processes from a process after supply of the sintering and shaping material 1 to the sintering and shaping apparatus 100 to a process of performing a sintering treatment of the shaped article 7 are performed under control of the control unit provided to the sintering and shaping apparatus 100.

First, the sintering and shaping material 1 that includes the inorganic particles 2a and the binder material 3 is prepared, and the material supply section 10 (the hopper 11) is filled with the sintering and shaping material 1. It is preferable to appropriately set respective ratios in accordance with shaping specifications of the sintered shaped article such as a particle size of the inorganic particles 2a, a particle size distribution, a volume filling rate by the inorganic particles 2a, and the layer thickness of the shaping layer 5 that is formed after being spread. Specifically, for example, a volume filling rate of the inorganic particles 2a is set to approximately 70%. In addition, it is preferable that dispersion of respective components is uniform.

In addition, the liquid binding agent 8 that includes the inorganic particles 8a and the curing agent 8b is prepared, and an ink cartridge is filled with the liquid binding agent 8 and is set to the cartridge loading unit 52.

As the inorganic particles 8a, inorganic particles composed of the same raw material are used as the inorganic particles 2a as an appropriate example, but there is no limitation thereto. In addition, an amount of the inorganic particles 8a which are included in the liquid binding agent 8 is adjusted in such a manner that a ratio between the weight of the inorganic particles 2a which are included in the shaping cross-sectional layer 6 that is formed and the weight of the inorganic particles 8a is in a range of 400:1 to 3:1. Specifically, as an appropriate example, with regard to the inorganic particles 2a of which a filling rate is adjusted to approximately 70% in the sintering and shaping material 1, the amount of inorganic particles 8a is adjusted in such a manner that the ratio between the weight of the inorganic particles 2a and the weight of the inorganic particles 8a becomes 9.5:1.

As the curing agent 8b, an ultraviolet curable resin is used as an appropriate example.

Next, the sintering and shaping material 1 is supplied from the material supply section 10 to the heating section 20 (hot plate 21). An amount of the sintering and shaping material 1 that is supplied to the heating section 20 at a time is controlled to an amount that is appropriate for an amount corresponding one layer of the shaping layer 5.

The heating section 20 heats the sintering and shaping material 1 by the hot plate 21 to a temperature that is equal to or higher than the melting point of the binder material 3 to melt the binder material 3, thereby forming the flowable shaping material 4.

Next, the flowable shaping material 4 is spread on the stage 41 by using spreading section 30. Specifically, the squeegee 31, which is brought into contact with the +X side of the sintering and shaping material 1 (flowable shaping material 4) having flowability, is moved in the −X direction, thereby pushing and stretching the sintering and shaping material 1 on the surface of the stage 41.

The stage 41 is kept at ordinary temperature (for example, room temperature), and the flowable shaping material 4 that is spread on the stage 41 is cooled down to ordinary temperature. When the flowable shaping material 4 is cooled down to room temperature, the binder material 3 is solidified, and thus the shaping layer 5 is formed, and the shaping layer forming process is completed.

The layer thickness of the shaping layer 5 is controlled in accordance with spreading specifications by the squeegee 31. Specifically, the layer thickness of the shaping layer 5 varies in accordance with the size of a gap between a lower end of the squeegee 31 and the X-Y plane (for example, a surface of the stage 41 at an initial position), a moving speed of the squeegee 31, viscosity of the flowable shaping material 4, and the like. Accordingly, it is preferable to perform appropriate setting so as to obtain a desired thickness.

Next, the drawing section 50 applies the liquid binding agent 8, in which the inorganic particles 8a are included, to a desired region of the shaping layer 5 formed on the stage 41 to form a desired image by the liquid binding agent 8. Specifically, the drawing section 50 ejects the liquid binding agent 8 while moving the ejection head 51 in accordance with image information, which is input in advance to the control unit, of each cross-sectional layer that constitutes the sintered shaped article, and applies the liquid binding agent 8 to a position corresponding to the cross-sectional shape of the sintered shaped article.

Figure 4:
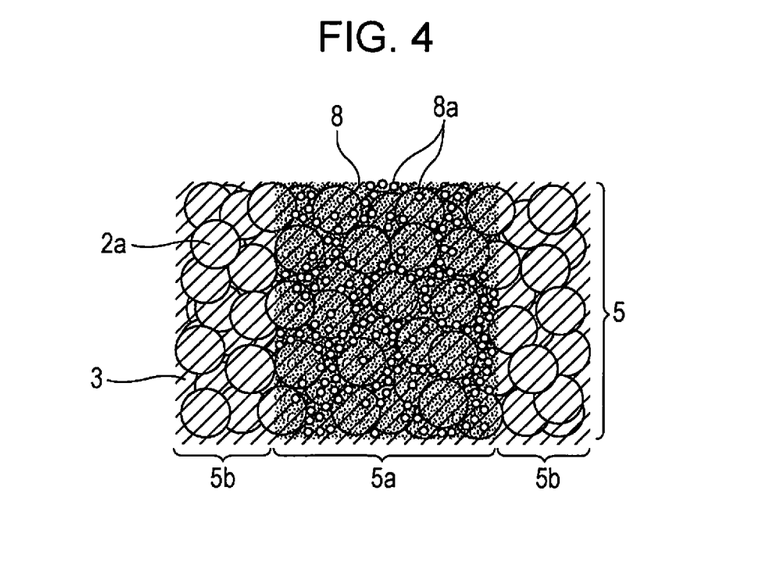
FIG. 4 is a conceptual diagram illustrating a state in which a liquid binding agent is applied to a desired region of a shaping layer.

FIG. 4 is a conceptual diagram illustrating a state in which the liquid binding agent 8 is applied to a desired region of the shaping layer 5 by the sintering and shaping apparatus 100.

In FIG. 1, since the binder material 3, which is dispersed in a flake shape, is melted and solidified at once, the volume filling rate of the inorganic particles 2a is increased, and the binder material 3 is distributed in an approximately uniform manner over the entirety of the shaping layer 5 while covering the surface of the inorganic particles 2a. As illustrated in FIG. 4, the liquid binding agent 8 that is selectively applied to a desired position penetrates into a region (a void portion between the inorganic particles 2a covered with the binder material 3) including the inorganic particles 2a and the binder material 3, and thus the shaping portion 5a is formed. In addition, as the liquid binding agent 8 (liquid portion 9) penetrates into the shaping layer 5, the inorganic particles 8a having a particle size smaller than that of the inorganic particles 2a enters the gap between the inorganic particles 2a.

Next, the curing section 60 cures the liquid binding agent 8 that is applied to the shaping layer 5 to form the shaping cross-sectional layer 6. Specifically, since the liquid binding agent 8 including the ultraviolet curable resin is used as an appropriate example, after retreating the carriage 53 from a position on the stage 41, the shaping layer 5 is irradiated with ultraviolet rays by an ultraviolet irradiator (liquid binding agent curing mechanism 61) to cure the liquid binding agent 8 that is applied to the shaping layer 5, thereby curing the shaping portion 5a.

In addition, it is preferable to perform the curing of the liquid binding agent 8 to the extent at which the curing is not completed so as to maintain bonding strength of an interface with the liquid binding agent 8 that is applied to a shaping layer 5 that is subsequently laminated.

Next, the stage elevating mechanism 42 allows the stage 41 to descend in accordance with the layer thickness of the shaping layer 5 that is spread and formed on the stage 41. When the stage 41 descends, the surface of the shaping layer 5 is flush with the surface of the hot plate 21, and thus the flowable shaping material 4 is spread again by the squeegee 31, and the X-Y plane that is laminated as the shaping layer 5 is constructed.

Then, the process of supplying the sintering and shaping material 1 from the material supply section 10 to the heating section 20 to the above-described process are repeated to laminate the shaping layer 5. That is, the shaping layer 5 of the second layer and thereafter is laminated on the shaping layer 5 that is previously formed.

In addition, it is possible to employ a method in which the process of spreading the flowable shaping material 4 and forming the shaping layer 5 is performed on a site other than on the stage 41, and the shaping layer 5 is sequentially transported to the stage 41 to be laminated.

When lamination of the shaping layer 5 is completed at a height corresponding to shaping of the shaped article 7, the shaped article 7 is taken out from the shaping section 40, and thus the shaped article 7 appears. Specifically, the shaped article (laminated article of the shaping layer 5) is transported from the shaping section 40 to the appearance section 70 by the transporting mechanism 43, and the non-shaping portion 5b to which the liquid binding agent 8 is not applied is removed by an unnecessary portion removing unit. According to this, the shaped article 7 (laminated shaping cross-sectional layer 6) appears.

Next, the shaped article 7 that appears is transported to the degreasing and sintering section 80 to perform a degreasing treatment. Specifically, first, the shaped article 7 is transported from the appearance section 70 to the inside of the degreasing and sintering furnace 81 by using the transporting mechanism 43, and degreasing of the shaped article 7 is performed. The degreasing is performed to remove the binder material 3 and the liquid binding agent 8 (curing agent 8b) that is applied and cured through thermal decomposition. In the degreasing process, a heating treatment is performed in a temperature range at which degreasing of the binder material 3 is initiated (in an appropriate example, a temperature (300 degrees of Celsius) that is higher than a thermal decomposition initiation temperature (approximately 200 degrees of Celsius) of polycaprolactone dial) to allow the degreasing of the binder material 3 and the liquid binding agent 8 (curing agent 8b) to proceed. Decomposed components which occur thermal decomposition of the binder material 3 and the liquid binding agent 8 (curing agent 8b) are discharged from the exhaust facility 84 by using a degreasing gas supplied from the degreasing gas supply facility 83.

Next, a sintering treatment of the degreased shaped article 7 is performed. Specifically, the temperature at which the degreasing treatment is performed is gradually raised to perform the heating treatment at a temperature at which the inorganic particles 2a are sintered. As an appropriate example, for example, in the case of using stainless alloy powder as the inorganic particles 2a, the heating temperature is gradually raised to 1300 degrees of Celsius at which the stainless alloy is sintered. When the sintering of the inorganic particles 2a and the inorganic particles 8a is completed, a desired sintered shaped article is obtained.

In the heating process of raising the gradually heating temperature, it is necessary to fuse the inorganic particles 8a to the inorganic particles 2a at a temperature that is lower than a sintering initiation temperature in which the sintering of the inorganic particles 2a initiates (a sintering initiation temperature in the case of performing sintering with only the inorganic particles 2a). The reason for this is due to a size effect (lowering of a melting point) capable of lowering the sintering initiation temperature through application of the inorganic particles 8a because the inorganic particles 8a are inorganic particles having a size of a nano particle level.

Figure 5:
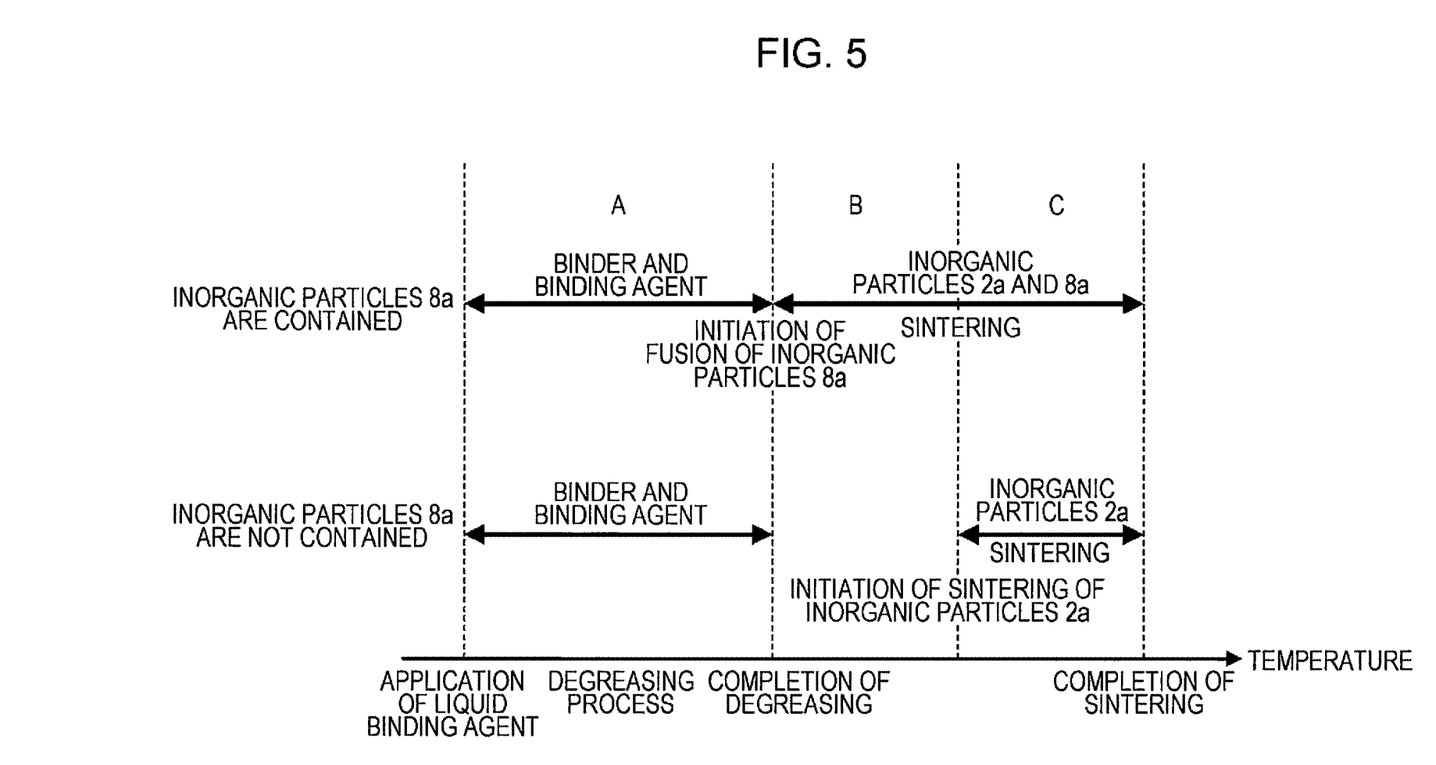
FIG. 5 is a conceptual diagram that compares heat treatment processes during degreasing and sintering with those in the related art.

FIG. 5 is a conceptual diagram that compares the heat treatment processes during degreasing and sintering with those in the related art (a case where the liquid binding agent 8 does not the inorganic particles 8a). FIG. 5 illustrates an aspect in which a connection state of a main material (inorganic particles) that constitutes the sintered shaped article varies in accordance with a change in the heat treatment temperature.

The main material (inorganic particles 2a) is supported by the binder material and the liquid binding agent that is applied and cured. However, in the degreasing process (a zone A illustrated in FIG. 5), the binder material and the liquid binding agent that is applied and cured are gradually heated and decomposed, and thus a force of connecting the main material (inorganic particles 2a) gradually becomes weak. This is also true of the related art and this example.

During a heat treatment in which the heating temperature is gradually raised after completion of the degreasing, and the sintering is completed, (zones B and C illustrated in FIG. 5), a state in which the main material (inorganic particles) is supported is different from the related art.

In the related art, in a range from completion of the degreasing to initiation of sintering of the inorganic particles (zone B illustrated in FIG. 5), a force of connecting the main material (inorganic particles 2a) becomes minimal. Accordingly, a dimensional variation of the shaped article 7 tends to occur in combination with an effect of a volume filling rate of the inorganic particles which is lower (due to the inorganic particles 2a alone) than a filling rate in this embodiment.

In contrast, in this embodiment, in the same zone B, fusion between the inorganic particles 8a and the inorganic particles 2a initiates, and the volume filling rate of the inorganic particles is higher (the inorganic particles 8a enter a void between the inorganic particles 2a) in comparison to the related art, and thus the dimensional variation of the shaped article 7 is less likely to occur.

In addition, the fusion between the inorganic particles 8a and the inorganic particles 2a may be initiated during the degreasing process (in this case, the fusion initiation temperature is lower than the thermal decomposition initiation temperature of the binder material 3 and the liquid binding agent 8 (curing agent 8b)). According to this configuration, the fusion between the inorganic particles 8a and the inorganic particles 2a is initiated before the force of connecting the main material (inorganic particles 2a) becomes minimal due to degreasing of the binder material 3 and the liquid binding agent 8 (curing agent 8b). According to this, the dimensional variation of the shaped article 7 is less likely to occur. In addition, the fusion to the inorganic particles 2a may be initiated after the degreasing process is completed. (In this case, the fusion initiation temperature is lower than the thermal decomposition initiation temperature of the binder material 3 and the liquid binding agent 8 (curing agent 8b). According to this configuration, the inorganic particles 8a enter the void between the main material (inorganic particles 2a) and the main material (inorganic particles 2a) and exist in the void. As a result, even when the binder material 3 and the liquid binding agent 8 (curing agent 8b) are degreased, the main material (inorganic particles 2a) is less likely to move, and thus the dimensional variation of the shaped article 7 is less likely to occur.

As described above, according to the sintering and shaping method, the liquid binding agent that is used for sintering shaping, and the sintered shaped article according to this embodiment, the following effects can be obtained.

The sintering and shaping method of this embodiment includes a shaping layer forming process of forming the shaping layer 5 by using the sintering and shaping material 1 in which the inorganic particles 2a are included, and a process of applying the liquid binding agent 8, in which the inorganic particles 8a are included, to a desired region of the shaping layer 5, and a process of curing the liquid binding agent 8 that is applied to form the shaping cross-sectional layer 6. Since these processes are included, it is possible to allow the inorganic particles 8a to be included in the shaping cross-sectional layer 6 in addition to the inorganic particles 2a. In addition, the method includes a process of removing a region of the shaping layer 5 to which the liquid binding agent 8 is not applied, and a process of heating the shaping cross-sectional layer 6, which is laminated, for a sintering treatment. Since these processes are included, a three-dimensional shaped article (sintered shaped article) is shaped by the shaping cross-sectional layer 6 that is laminated. In addition, the sintering treatment is performed, and thus it is possible to increase the strength of the three-dimensional shaped article.

In addition, the inorganic particles 8a are further included in the shaping cross-sectional layer 6 in addition to the inorganic particles 2a, and thus it is possible to obtain a sintered shaped article in which a density (a volume filling rate) of the inorganic particles is relatively high. As a result, the dimensional variation (shrinkage) of the sintered shaped article in the case of performing the sintering treatment is further suppressed, and thus it is possible to shape a sintered shaped article with relatively high dimensional accuracy.

In addition, the inorganic particles 8a are fused to the inorganic particles 2a at a temperature that is lower than a sintering initiation temperature at which the inorganic particles 2a initiate sintering, and thus it is possible to allow the inorganic particles 8a to function as a binder that binds the inorganic particles 2a to each other. As a result, the dimensional variation (shrinkage) of the sintered shaped article in the case of performing the sintering treatment is further suppressed, and thus it is possible to shape a sintered shaped article with relatively high dimensional accuracy.

In addition, the sintering and shaping material 1 includes the thermoplastic binder material 3 that binds the inorganic particles 2a, and the shaping layer forming process is performed by heating the sintering and shaping material 1 at a temperature that is equal to or higher than the melting point of the binder material 3. Since the sintering and the shaping material 1 is heated to a temperature that is equal to or higher than the melting point of the binder material 3, the flowability of the sintering and shaping material 1 increases. According to this, it is possible to spread the sintering and shaping material 1 in a relatively easy manner, and thus it is possible to form the shaping layer 5 with relatively high dimensional accuracy. In addition, in the heating process for the sintering treatment, the binder material 3 contributes to binding of the inorganic particles 2a until the binder material 3 is thermally decomposed (until degreasing is completed). According to this embodiment, it is possible to shape a sintered shaped article with relatively high dimensional accuracy.

In addition, since the ratio between the weight of the inorganic particles 2a which are included in the shaping cross-sectional layer 6 and the weight of the inorganic particles 8a which are included in the shaping cross-sectional layer 6 is in a range of 400:1 to 3:1, it is possible to perform shaping in a state in which the inorganic particles 2a are set as a main material. In addition, it is possible to obtain a sintered shaped article in which a density of the inorganic particles is relatively high due to the inorganic particles 8a which are applied to the main material. As a result, the dimensional variation (shrinkage) of the sintered shaped article in the case of performing the sintering treatment is further suppressed, and thus it is possible to shape a sintered shaped article with relatively high dimensional accuracy.

In addition, since the ratio between the average particle size of the inorganic particles 2a and the average particle size of the inorganic particles 8a is in a range of 50000:1 to 10:1, it is possible to perform shaping in a state in which the inorganic particles 2a are set as a main material, and it is easy for the inorganic particles 8a, which are applied, to penetrate into a space between the main material (the inorganic particles 2a) in combination with the liquid binding agent 8. As a result, it is possible to form the shaping cross-sectional layer 6 in which a density of the inorganic particles is increased with a relatively uniform manner, and thus it is possible to obtain a sintered shaped article in which the density of the inorganic particles is increased with a relatively uniform manner. As a result, the dimensional variation (shrinkage) of the sintered shaped article in the case of performing the sintering treatment is further suppressed, and thus it is possible to shape a sintered shaped article with relatively high dimensional accuracy.

In addition, the average particle size of the inorganic particles 8a is 0.001 micrometers to 10 micrometers. That is, the inorganic particles 8a are inorganic particles having a size of a nano particle level (1 nm to 10000 nm). Accordingly, in a case of applying the liquid binding agent 8 to a desired region of the sintering and shaping material 1 in which inorganic particles 2a are included, it is possible to allow the inorganic particles 8a to easily enter a void between the inorganic particles 2a. That is, it is possible to increase a density of the inorganic particles in a relatively uniform manner, and thus it is possible to obtain a sintered shaped article in which the density of the inorganic particles is increased in a relatively uniform manner. In addition, the inorganic particles 8a are inorganic particles having a size of a nano particle level, and thus when applying the inorganic particles 8a, it is possible to lower a sintering initiation temperature of the sintered shaped article. That is, sintering of the inorganic particles 8a and the inorganic particles 2a is initiated at a relatively low temperature due to a size effect of the inorganic particles 8a. Accordingly, for example, in a case of the inorganic particles 2a and the inorganic particles 8a are composed of the same metal, it is possible to initiate sintering at a temperature that is lower than a sintering initiation temperature in a case of the inorganic particles 2a alone. As a result, it is possible to suppress a dimensional variation (for example, a dimensional variation due to thermal decomposition (degreasing) of the binder material 3 included in the sintering and shaping material 1) in the heating process for a sintering treatment from a relatively low temperature, and thus the dimensional variation (shrinkage) of the sintered shaped article is further suppressed, and thus it is possible to shape a sintered shaped article with relatively high dimensional accuracy.

In addition, since the inorganic particles 2a and the inorganic particles 8a are ceramic particles or metal particles, it is possible to perform a sintering treatment with respect to a sintered shaped article including these particles as a main material. As a result, it is possible to obtain a relatively strong sintered shaped article.

The liquid binding agent 8 of this embodiment is a liquid binding agent 8 that is used for manufacturing of a sintered shaped article. The liquid binding agent 8 is applied to a desired region of the sintering and shaping material 1 in which the inorganic particles 2a are included, and the application region is cured to form a region that constitutes a sintered shaped article. In addition, the inorganic particles 8a are included in the liquid binding agent 8. That is, according to the liquid binding agent 8 of this embodiment, the inorganic particles 8a can be further included in the desired region for shaping of the sintered shaped article in addition to the inorganic particles 2a. As a result, it is possible to obtain a sintered shaped article in which the density of the inorganic particles is high.

In addition, the average particle size of the inorganic particles 8a which are included in the liquid binding agent 8 is 0.001 micrometers to 10 micrometers. That is, the inorganic particles 8a are inorganic particles having a size of a nano particle level. Accordingly, in a case of applying the liquid binding agent 8 to a desired region of the sintering and shaping material 1 in which the inorganic particles 2a are included, it is possible to allow the inorganic particles 8a to easily enter a void between the inorganic particles 2a. That is, it is possible to increase a density of the inorganic particles (inorganic particles 2a and inorganic particles 8a) in a relatively uniform manner, and thus it is possible to obtain a sintered shaped article in which the density of the inorganic particles is increased in a relatively uniform manner.

In addition, for example, in a case where the inorganic particles 2a which are included in the sintering and shaping material 1 are the same ceramic particles as the inorganic particles 8a which are included in the liquid binding agent 8, or in a case where the inorganic particles 2a which are included in the sintering and shaping material 1 are the same metal particles as the inorganic particles 8a which are included in the liquid binding agent 8, it is possible to perform a sintering treatment with respect to the sintered shaped article in which these particles are set as a main material. As a result, it is possible to obtain a relatively strong sintered shaped article.

In the sintered shaped article that is shaped by the above-described sintering and shaping method, that is, the sintered shaped article that is shaped by using the liquid binding agent 8, in other words, in the sintered shaped article, which is constituted by the inorganic particles 2a included in advance in the sintering and shaping material 1 that is laminated, and the inorganic particles 8a included in the liquid binding agent 8 which is applied to the sintering and shaping material 1 that is laminated, the dimensional variation (shrinkage) of the sintered shaped article in the case of performing the sintering treatment is further suppressed, and thus the sintered shaped article with relatively high dimensional accuracy is provided.

REFERENCE SIGNS LIST

1 Sintering and shaping material
2 Powder material
2a Inorganic particle
3 Binder material
3a Binder flake
4 Flowable shaping material
5 Shaping layer
5a Shaping portion
5b Non-shaping portion
6 Shaping cross-sectional layer
7 Shaped article
8 Liquid binding agent
8a Inorganic particle
8b Curing agent
9 Liquid portion
10 Material supply section
11 Hopper
12 Material ejecting port
20 Heating section
21 Hot plate
30 Spreading section
31 Squeegee
40 Shaping section
41 Stage
42 Stage elevating mechanism
43 Transporting mechanism
50 Drawing section
51 Ejection head
52 Cartridge loading unit
53 Carriage
54 Carriage moving mechanism
60 Curing section
61 Liquid binding agent curing mechanism
70 Appearance section
80 Degreasing and sintering section
81 Degreasing and sintering furnace
82 Heating heater
83 Degreasing gas supply facility
84 Exhaust facility
100 Sintering and shaping apparatus

The invention claimed is:
1. A sintering and shaping method, comprising:
a shaping layer forming process of forming a shaping layer by using a sintering and shaping material including first inorganic particles and a thermoplastic binder that binds the first inorganic particles to each other;
a process of applying a liquid binding agent, in which second inorganic particles are included, to a desired region of the shaping layer, the second inorganic particles having a lower sintering initiation temperature, at which sintering is initiated, than the first inorganic particles;
a process of curing the liquid binding agent, which is applied, to form a shaping cross-sectional layer;

a process of removing a region of the shaping layer to which the liquid binding agent is not applied; and a process of heating the shaping cross-sectional layer for a sintering treatment by performing a degreasing process of heating and decomposing the thermoplastic binder and the liquid binding agent, that has been applied and cured, so that a sintering process of heating and fusing the first inorganic particles and the second inorganic particles is initiated during the degreasing process at a temperature lower than the sintering initiation temperature of the first inorganic particles.

2. The sintering and shaping method according to claim 1, wherein the sintering process of heating and fusing the first inorganic particles and the second inorganic particles is performed at a temperature that is lower than a sintering initiation temperature at which the first inorganic particles initiate sintering.

3. The sintering and shaping method according to claim 1, wherein the shaping layer forming process is performed by heating the sintering and shaping material to a temperature that is equal to or higher than a melting point of the thermoplastic binder.

4. The sintering and shaping method according to claim 1, wherein a ratio between the weight of the first inorganic particles which are included in the shaping cross-sectional layer and the weight of the second inorganic particles which are included in the shaping cross-sectional layer is in a range of 400:1 to 3:1.

5. The sintering and shaping method according to claim 1, wherein a ratio between an average particle size of the first inorganic particles and an average particle size of the second inorganic particles is in a range of 50000:1 to 10:1.

6. The sintering and shaping method according to claim 1, wherein the average particle size of the second inorganic particles is 0.001 micrometers to 10 micrometers.

7. The sintering and shaping method according to claim 1, wherein the first inorganic particles and the second inorganic particles are ceramic particles or metal particles.

* * * * *